Jan. 11, 1966    G. A. RUTLEDGE    3,228,552
CONTAINER WITH LIFT-OFF LID
Filed Feb. 27, 1962    2 Sheets-Sheet 1

*INVENTOR.*
GEORGE A. RUTLEDGE
BY
*Glenn, Palmer &
Matthews*
HIS ATTORNEYS

Jan. 11, 1966  G. A. RUTLEDGE  3,228,552
CONTAINER WITH LIFT-OFF LID
Filed Feb. 27, 1962  2 Sheets-Sheet 2
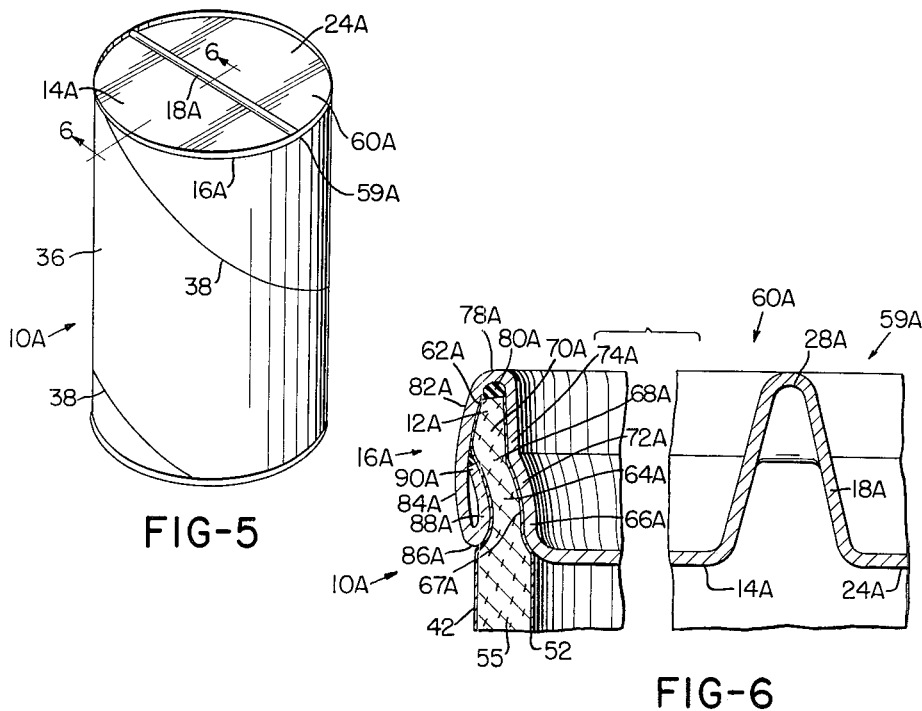
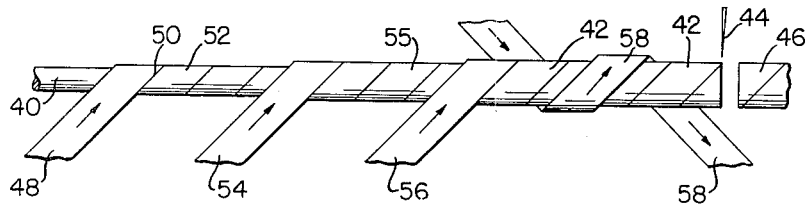
INVENTOR.
GEORGE A. RUTLEDGE
HIS ATTORNEYS United States Patent Office 3,228,552
Patented Jan. 11, 1966

3,228,552
CONTAINER WITH LIFT-OFF LID
George Arthur Rutledge, Richmond, Va., assignor to Reynolds Metals Company, Richmond, Va., a corporation of Delaware
Filed Feb. 27, 1962, Ser. No. 175,982
11 Claims. (Cl. 220—47)

This invention relates to a container with an improved lift-off lid, and a method of making the same.

The container of this invention may be used for marketing many commodities, fluids, liquids and the like, including frozen juices, such as orange juices and the like.

A feature of this invention includes the lid or cover of the container which may be bendably lifted off by an ordinary hooked cap opener or the like without the necessity of cutting the container or the lid.

Another feature of this invention includes a cover which is easily and sanitarily removed from the container.

Another feature of this invention includes a cover which may be partially opened in a manner such that the outer, usually unsanitary surfaces of the cover or the container need not come into contact with the contents of the container while they are being removed from the container.

Accordingly, an object of this invention is to provide a container and/or cover having one or more of the features herein disclosed.

Another object of this invention is to provide a method of making a container and/or cover having one or more of the features herein disclosed.

Other objects are apparent from this description and/or from the accompanying drawings, in which:

FIGURE 5 is a perspective view of another embodiment of a container embodying this invention.

FIGURE 6 is an enlarged cross section taken along the line 6—6 of FIGURE 5.

FIGURE 7 is a diagrammatic view of a portion of an apparatus and/or process of forming the embodiment of FIGURES 5 and 6.

Figures 1, 2:
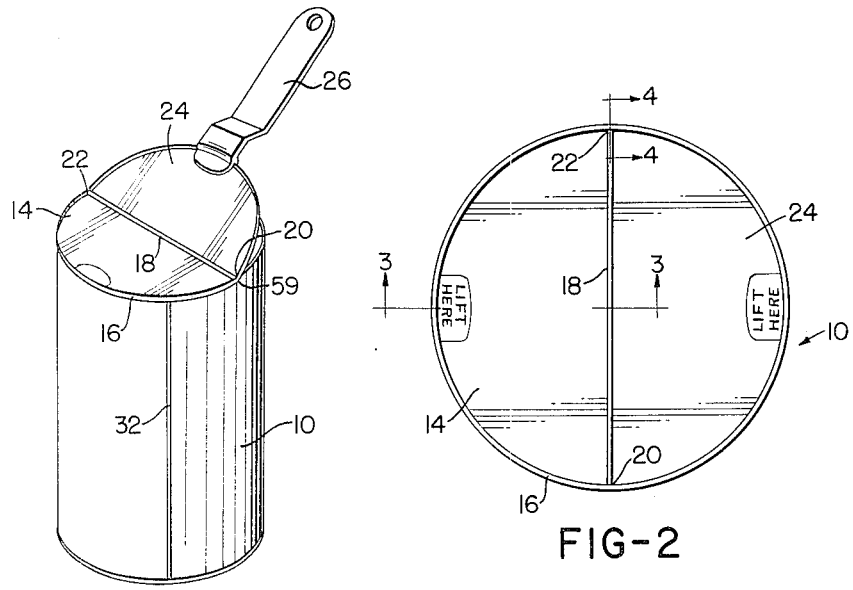
FIGURE 1 is a perspective view of a container embodying this invention.
FIGURE 2 is a top view of the container and cover of FIGURE 1, before the cover is lifted off the container.
Figure 4:
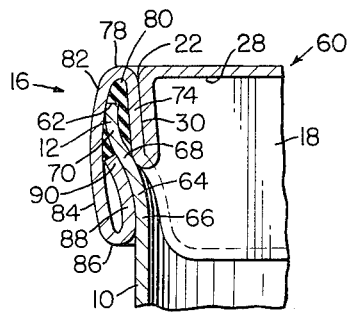
FIGURE 4 is an enlarged cross section taken along the line 4—4 of FIGURE 2.

Certain words indicating direction, relative position, and the like are used herein for brevity and clarity of description, such as "upper," "lower," "vertical," "horizontal," etc. However, it is to be understood that such words apply only to the drawings, and that the articles, members, etc., in actual use may have other directions and relative positions.

According to this invention a container 10, which may be made of sheet material, such as sheet aluminum, may have a circular container upper end body portion 12 having an upper edge 62. A sheet material cover 14 may cover said container edge 62 with a liftable hermetically sealed joint 16 between the body portion 12 of the container and the cover 14.

The description of the upper cover 14 and upper body portion may also apply to the lower body portion and cover, with appropriate revision of the directional words.

A bendable score 18 on the cover 14 is provided, and may extend from one position 20 adjacent to the joint 16 to another position 22 adjacent the joint 16. This permits a portion of the cover 14, such as portion 24, to be lifted from the container 10 and to be bent along the score 18 as a fulcrum. This bending operation may be performed by a hooked cover lifter 26 of any well known type, which is adapted to engage the lower part of the joint 16 and a portion of the cover 14, to produce the bending operation shown in FIGURE 1.

If desired, the container 10 may be cylindrical and the container edge 62 may be a circular container edge. Any other curved orbital container edge and cylindraceous container may be used.

Figure 3:
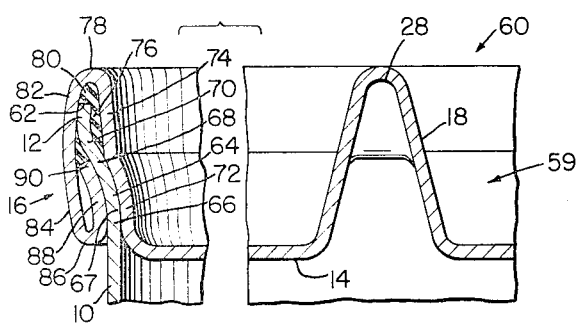
FIGURE 3 is an enlarged cross section taken along the line 3—3 of FIGURE 2.

The score 18 may be an inverted groove 18, as shown in FIGURE 3, and if desired, may be a straight groove or score which extends substantially through the central part of the cover, such as through the radius center of the circular joint 16. The score 18 may have the groove 28 along the uppermost part of the score 18.

The inverted groove 28 of the score 18 may have a short downward dip 30 adjacent to the joint 16, to permit the joint 16 to be substantially continuous around the periphery of the lid 14 and to maintain a continuous seal around the end body portion 12 of the container 10.

In the embodiment shown in FIGURES 1 through 4, the container 10 may be made of sheet metal, such as aluminum sheet made of aluminum or a suitable aluminum alloy. Such sheet metal may be cut into a substantially rectangular blank and may be curved into the form of a cylinder, with its edges secured together along the seam 32, of any well known seam construction, and which may be placed anywhere along the circumference of the container 10.

The inner and outer surfaces of the sheet container 10 may be metallic surfaces, which provide a tight seal between the container edge 62, and the joint 16, and at the same time provide easily slidable contacts with the contiguous surfaces of the cover 14, which also may be metallic surfaces, so that the joint 16 between the cover 14 and the container edge 62 may be liftably bent, as shown in FIGURE 1, along the score 18, in an easy manner. The cover may be partially or completely lifted from the container, as desired.

In another embodiment, a cylindrical container 10A, as shown in FIGURES 5 and 6, may be made of spirally wound strip material 36. The material 36 may have one or more spiral edges 38 adhered together.

Any suitable method or apparatus may be used to form the spirally wound container 10A of FIGURES 5 and 6. For example, FIGURE 7 discloses an apparatus or method which may be used in forming such a spirally wound container. For example, a stationary smooth mandrel 40 may be used around which the strip material is spirally wound to form a spirally wound tube 42 which may be cut at 44 into suitable lengths 46. These lengths 46 may be of the same length or longer than the container 10A shown in FIGURE 5, if desired. If longer lengths are made they may be further subdivided or cut into cylindrical tubes of the correct size to form the container 10A, or the like.

Merely by way of example, a strip 48 of a laminate of aluminum foil and paper backing is fed onto the stationary mandrel 40 with the foil adjacent to the mandrel. A suitable adhesive is applied by well known means to the overlapped edge 50, so that such overlapped edge may adhere to the previously spirally wound tube or portion 52.

Another strip 54 of strip material may be a paperboard strip which is fed over the previously formed tube 52. The strip material 54 may have adhesive applied to its under surface by well known means and may be spirally wound edge to edge, without any overlapping of the edges, but with the edges closely adjacent each other. Thereafter, a strip 56, preferably made as a lamination of aluminum foil on the outside and paper backing on the inside (or foil only) may be spirally wound on the previously spirally wound paperboard tube 55. The foil is placed on the outside, and an adhesive is applied to the paper backing to cause the lamination to adhere to the paper board tube 42.

The strip material 54 preferably is placed on the spiral tube 52 with the central part of strip 54 overlying the seam of tube 52. Likewise the strip 56 is fed over the tube 55, with the central portion of the strip 56 overlying the spiral edge of the tube 55.

Suitable adhesive is fed to the strips 48, 54 and 56, or portions thereof, by suitable means, as is well known. The tube 42 formed by the strip 56 is rotated by the belt construction 58 which causes all of the tubes 52, 55 and 42 to rotate in unison about the stationary mandrel 40, as is well known in the art.

One or more paper board strips 54 may be used, if desired.

The tube 42 of FIGURE 7, may be cut to container size, and may form the outer layer 42 of the container 10A, FIGURE 6. The tube 52, FIGURE 7, when cut to container size, forms the inner layer 52 of FIGURE 6. The tube 55 of FIGURE 7, when it has been cut to container size, forms the intermediate layer 55 of FIGURE 6. Both the layers 42 and 52 have metal foil, such as aluminum foil, on their outer surfaces, so that foil forms a metallic surface on the outside of the container body 10A, and foil forms a metallic surface on the inside of the tube 10A in FIGURE 6.

This invention is applicable to all constructions in which a container body such as 10 or 10A or any other suitable container body, is provided with a pry-off cover 14 or 14A which can be pried off by any suitable hooked cover remover 26 of well known construction. If the cover 14, or 14A and the like, is circular, the bendable score 18 or 18A may be placed along the diameter of the circle, so that one-half of the lid 24 or 24A may be pried upwardly, as indicated in FIGURE 1. The bead or joint 18 or 18A is adapted to bend at the point 59, 59A at both ends of the score 18 or 18A.

All of the numerals which have been used in FIGURES 5 and 6, which have the same numerals as FIGURES 1 through 4, with the suffix "A" added, are intended to operate in substantially the same manner as in FIGURES 1 through 4, except where other wise described or illustrated or is obviously different.

This bendable cover and bendable score feature of this invention is applicable to all types of pry-off covers and containers. As specifically illustrated in FIGURES 1 through 4, the specific joint construction may be applied to a shallow cup-like cover 60.

The circular, shallow cup-like cover or cup 60 may be secured to the pry-off end body portion 12 so it has a final form as shown in FIGURES 1–4. The pry-off end body portion 12 terminates in the upper body and edge 62 and has an upwardly increasingly flared body portion 64 extending approximately from the point 66 to the point 68. The flare of portion 64 gradually increases due to the curvature imparted to the flare of the body portion from the point 66 to the point 68. The body portion 64 is joined by an upwardly uniformly flared merging body portion at point 68 to an upwardly decreasingly flared body portion 70 which terminates at the upper body end edge 62. The portion 70 is upwardly decreasingly flared because of the curvature of the flare from the point 68 to the point 62.

The circular cup-like cover 60 sealingly engages the pry-off upper end body portion 12. It has an upwardly increasingly flaring inner cup-like portion 72 tightly and contiguously engaging the inside of the increasingly flaring body portion 64. The cup also has an upward substantially uniformly increasing flaring inner cup portion 74 adjacent to but spaced from the decreasingly flaring body portion 70 to form a side part 76 of a sealing compound space. The lower end of space 67 is sealed by the contiguous portions 64 and 72.

The cup-like cover 60 has a reverse turn at 78 spaced above and turning above the upper body end edge 62 to form an upper part 80 of a sealing compound space above said upper body end edge 62.

The turn 78 of the cover merges with an outer cover part 82 having a downward, outwardly and gradually flaring outer cover portion which engages the extreme upper end of the body adjacent to the upper body end edge 62, to seal the upper sealing compound space 80.

The outer cup portion 82 merges with a gradually inwardly contracting outer cup portion 84 which has an inward reverse fold 86 with an increasingly flaring fold portion 88 which tightly engages the outer surface of said increasingly flaring body portion 64.

The end 90 of the reverse fold 88 smoothly and slidingly engages the uniformly flared merging body portion 68, so that the fold portion may be easily upwardly pried off with a hook type cover opener and the like.

Any well known sealing compound may be used substantially to fill the said sealing compound space 76, 80 heretofore described.

The sealing compound produces an effective hermetic seal which is tightly enclosed by the rolling and curling operations to be described.

In the embodiment of FIGURES 5 and 6, the cover or cup 60A may be secured to the pry-off end body portion 12A so it has the final form shown in FIGURES 5 and 6. The body portion 12A terminates in the body end edge 62A and has an upwardly increasingly flared body portion 64A. The body portion 64A is joined by an upwardly decreasingly flared body portion 70A which terminates at the end edge 62A.

The cover 60A sealingly engages the pry-off end body portion 12A. It has an upwardly increasingly flaring inner cup-like portion 72A tightly and contiguously engaging the inside of the increasingly flaring portion 64A. The cup or cover also may have an upward substantially uniformly increasing flaring inner cup portion 74A adjacent to the body portion 70A.

The cup-like cover 60A also has reverse turn 78A to form a sealing compound space 80A above said end edge 62.

The cover 78A also has members 82A, 84A, 86A, 88A, 90A which have substantially the same shape and function as the similarly numbered parts of FIGURES 1–4 which do not have the suffix A.

Any other type of pry-off seam and cover may be used in which a bendable score or inverted groove may be used.

A new and useful container and pry-off cover, and method of making the same have been provided.

The bendable cover feature provides a more sanitary construction for the removal of the contents of the container.

While the form of the invention now preferred has been disclosed as required by statute, other forms may be used, all coming within the scope of the claims which follow.

What is claimed is:

1. In combination: a sheet material container having an end body portion provided with a substantially circular container edge; a sheet metal cover covering said container edge with a liftable, hermetically sealed joint between said end body portion and said cover, said cover having a main surface and an inverted U-shaped end portion telescoping with said end body portion to define said joint; and a bendable score on said cover extending from one position on said U-shaped end portion to another position of said U-shaped end portion to permit a portion of said cover to be lifted from said container edge and be bent along said score as a fulcrum, said score being defined by an inverted V-shaped portion raised out of the plane of said surface of said cover and extending above a plane defined by said container edge.

2. In combination: a container having an end body portion provided with a substantially circular container edge; a sheet cup-like cover having a substantially circular inverted U-shaped end portion telescoping said end body portion to provide a liftable, hermetically sealed joint between said container and cover, the bottom of said cup-like member having a bendable score extending from one position on said U-shaped end portion to another position on said U-shaped end portion to permit a portion of said cover to be lifted from said container edge and be bent along said score as a fulcrum, said score being defined by an inverted V-shaped portion raised out of the plane of said bottom of said cover and extending above said cover and extending above a plane defined by said container edge.

3. In combination: a container having an end body portion provided with a curved orbital container edge; a sheet cover having an inverted U-shaped end portion telescoping said end body portion to provide a liftable hermetically sealed joint between said end body portion and said cover, said cover having a main surface; and a bendable score on said cover extending from one position on said U-shaped end portion to another position on said U-shaped end portion to permit a portion of said cover to be lifted from said container edge and be bent along said score as a fulcrum, said score being defined by an inverted V-shaped portion raised out of the plane of said surface of said cover and extending above a plane defined by said container edge.

4. A combination according to claim 3 in which said joint forms an inverted groove along its uppermost part.

5. A combination according to claim 3 in which the inverted groove portion of said score has a short downward dip adjacent said joint.

6. A combination according to claim 3 in which said container is made of sheet metal.

7. A combination according to claim 3 in which said cover is made of sheet metal.

8. A combination according to claim 3 in which said container is made of a metal foil and fibrous material lamination.

9. A combination according to claim 3 in which said container is made of spirally wound strip material.

10. A combination according to claim 9 in which said strip material forms inner and outer foil layers on said container.

11. In combination: a cylindrical container having a cover engaging container end portion; a circular, shallow cup-like cover having a flat bottom with a bendable score traversing said bottom, said score being defined by an inverted V-shaped portion raised out of the plane of said bottom wall and extending from one position on said end portion to another position on said end portion, said V-shaped portion extending above a plane defined by the upper edge of said container end portion, said cover having a short wall extending upwardly from said bottom and tightly engaging the inner surface of said container end portion, then bending over and around said container end portion and extending downwardly to form an outer wall construction with a portion tightly engaging the outer surface of said container end portion to form a bendably liftable cover.

References Cited by the Examiner
UNITED STATES PATENTS

| | | | |
|---|---|---|---|
| 893,769 | 7/1908 | Weber | 220—53 |
| 1,491,325 | 4/1924 | Thomas | 220—27 |
| 1,576,088 | 3/1926 | Bunz | 229—43 X |
| 2,188,497 | 1/1940 | Calva | 229—5.6 X |
| 2,237,809 | 4/1941 | Bronson | 229—5.6 X |
| 2,249,052 | 7/1941 | Seiffert | 229—5.6 |
| 2,428,371 | 10/1947 | Kinberg | 220—67 |
| 2,470,984 | 5/1949 | Horning et al. | 229—43 X |
| 2,471,017 | 5/1949 | Wilcox | 229—43 X |
| 2,493,671 | 1/1950 | Horning | 229—43 X |
| 2,848,151 | 8/1958 | O'Neil | 229—3.5 X |
| 2,974,824 | 3/1961 | Mansho | 220—53 |
| 3,042,286 | 7/1962 | Pottle | 229—4.5 X |

FOREIGN PATENTS

| | | |
|---|---|---|
| 43,564 | 1/1927 | Norway. |
| 51,984 | 1/1933 | Norway. |

THERON E. CONDON, *Primary Examiner.*

GEORGE O. RALSTON, *Examiner.*